(12) United States Patent
Watanabe

(10) Patent No.: US 7,155,227 B2
(45) Date of Patent: Dec. 26, 2006

(54) MOBILE TERMINAL CALLING APPARATUS, MOBILE TERMINAL CALLING METHOD, EXCHANGE APPARATUS, AND MOBILE COMMUNICATION SYSTEM

(75) Inventor: Yugo Watanabe, Yokohama (JP)

(73) Assignee: NTT DoCoMo Inc., Tokyo (JP)

( * ) Notice: Subject to any disclaimer, the term of this patent is extended or adjusted under 35 U.S.C. 154(b) by 972 days.

(21) Appl. No.: 10/123,152

(22) Filed: Apr. 17, 2002

(65) Prior Publication Data

US 2002/0155837 A1    Oct. 24, 2002

(30) Foreign Application Priority Data

Apr. 18, 2001    (JP) .............................. 2001-119765

(51) Int. Cl.
*H04Q 7/20* (2006.01)
(52) U.S. Cl. .................. 455/445; 455/433; 455/435.2; 455/456.1
(58) Field of Classification Search ................ 455/445, 455/456.1, 435.2, 433
See application file for complete search history.

(56) References Cited

U.S. PATENT DOCUMENTS 5,978,682 A * 11/1999 Van Der Werff et al. ... 455/445
5,983,109 A    11/1999 Montoya

FOREIGN PATENT DOCUMENTS

| CN | 1201356 A | 12/1998 |
| EP | 0 732 863 | 9/1996 |
| EP | 0 866 628 A2 | 9/1998 |
| WO | WO 00/28769 | 5/2000 |

* cited by examiner

*Primary Examiner*—Joseph Feild
*Assistant Examiner*—S. Smith
(74) *Attorney, Agent, or Firm*—Oblon, Spivak, McClelland, Maier & Neustadt, P.C.

(57) ABSTRACT

A mobile terminal calling apparatus for calling a mobile terminal existing in a location area constituted by a plurality of cells to corresponding to a plurality of wireless base stations comprises a determination unit and a control unit. When there is a calling request for the mobile terminal, the determination unit determines the kind of the calling request. According to the kind of the calling request determined by the determination unit, the control unit decides a sequence of calling for the plurality of cells constituting the location area.

8 Claims, 7 Drawing Sheets

MOBILE TERMINAL CALLING APPARATUS, MOBILE TERMINAL CALLING METHOD, EXCHANGE APPARATUS, AND MOBILE COMMUNICATION SYSTEM

BACKGROUND OF THE INVENTION

1. Field of the Invention

The present invention relates to a mobile terminal calling apparatus, a mobile terminal calling method, an exchange apparatus, and a mobile communication system which call mobile terminals.

2. Related Background Art

Conventional mobile communication systems employ a technique in which, when a mobile terminal calling apparatus calls a mobile terminal, all the cells constituting a location area where the mobile terminal exists are called simultaneously. FIG. 7 is a view showing a location area 51 constituted by 19 cells 50. When there is a calling request for a mobile terminal 52, the mobile communication system calls all the cells 50 constituting the location area 51.

SUMMARY OF THE INVENTION

Calling requests for the mobile terminal 52 include those of a kind requiring real-time immediacy, such as voice calls, in which delays become problematic, and those of a kind not requiring real-time immediacy, such as email, in which delays are not problematic. However, the conventional mobile communication systems employ a technique in which, when a mobile terminal calling apparatus calls a mobile terminal, all the cells constituting a location area where the mobile terminal exists are called simultaneously regardless of kinds of calling requests. Therefore, wireless resources will be wasted for cells other than the cell in which the mobile terminal exists, if the kind of the calling request is a non-real-time call in which the delay of call is unproblematic.

In view of such circumstances, it is an object of the present invention to provide a mobile terminal calling method, an exchange apparatus, and a mobile communication system which reduce the waste of wireless resources.

The present invention provides a mobile terminal calling apparatus for calling a mobile terminal existing in a location area constituted by a plurality of cells corresponding to a plurality of wireless base stations, the mobile terminal calling apparatus comprising determination means and sequencing means. When there is a calling request for the mobile terminal, the determination means determines the kind of the calling request. According to the kind of the calling request determined by the determination means, the sequencing means decides a sequence of calling for the plurality of cells constituting the location area.

Since the mobile terminal calling apparatus determines the kind of the calling request as such, it can decide the sequence of calling for the individual cells constituting a location area without carrying out simultaneous calling if no real-time immediacy is required so that delays in calling are not problematic. Therefore, by calling a smaller number of cells as compared with simultaneous calling, the mobile terminal calling apparatus can specify the cell in which the mobile terminal is located, whereby the waste of wireless resources can be reduced. Also, while wireless traffic is ameliorated, the processing in wireless base stations and the control of wireless base stations are carried out efficiently.

Preferably, the mobile terminal calling apparatus in accordance with the present invention further comprises channel status detecting means for detecting channel statuses in the plurality of cells constituting the location area, whereas the sequencing means decides the sequence of calling in order of excellence of the channel statuses detected by the channel status detecting means.

Thus, the mobile terminal calling apparatus detects the channel statuses in all the cells constituting the location area, and decides the sequence of calling such that the cells are called earlier as their channel statuses are better. Therefore, the mobile terminal calling apparatus can call cells in order of excellence of their channel statuses. In a cell having a better channel status, the field intensity between a wireless base station and a mobile terminal is usually higher, whereby the mobile terminal calling apparatus can easily determine at a high accuracy whether the cell is one in which the mobile terminal exists or not. As a consequence, the cell in which the mobile terminal exists can be specified rapidly.

Preferably, in the mobile terminal calling apparatus in accordance with the present invention, the sequencing means decides the sequence of calling in order of closeness to a cell in which the mobile terminal registered a position thereof.

Thus, the mobile terminal calling apparatus decides the sequence of calling such that cells located closer to the cell in which the mobile terminal lastly registered the position thereof are called earlier. The distance to the mobile terminal is shorter in cells located closer to the cell in which the last positional registration was made, whereby the probability of the mobile terminal existing there is higher. Therefore, the mobile terminal calling apparatus can rapidly specify the cell in which the mobile terminal exists.

Preferably, the mobile terminal calling apparatus in accordance with the present invention further comprises a database unit for storing the kind of the calling request and the sequence of calling in relation to each other.

In such a manner, the mobile terminal calling apparatus presets a relationship between the kind of the calling request and the sequence of cells to be called, and refers to data stored in the database unit when deciding the sequence of calling. As a consequence, according to the kind of the calling request determined by the determination means, the sequence of calling in conformity to the kind of the calling request is decided rapidly.

Preferably, the mobile terminal calling apparatus in accordance with the present invention further comprises calling means for calling the mobile terminal according to the sequence of calling.

As a consequence, by calling a smaller number of cells as compared with simultaneous calling, the mobile terminal calling apparatus can specify the cell in which the mobile terminal is located, whereby the waste of wireless resources can be reduced. Also, while wireless traffic is ameliorated, the processing in wireless base stations and the control of wireless base stations are carried out efficiently.

The present invention provides a mobile terminal calling method in which a mobile terminal calling apparatus calls a mobile terminal existing in a location area constituted by a plurality of cells corresponding to a plurality of wireless base stations, the mobile terminal calling method comprising a determining step and a sequencing step. In the determining step, when there is a calling request for the mobile terminal, the mobile terminal calling apparatus determines the kind of the calling request. In the sequencing step, according to the kind of the calling request determined by the determining step, the mobile terminal calling apparatus decides a sequence of calling for the plurality of cells constituting the location area.

Since the mobile terminal calling apparatus determines the kind of the calling request, it can decide the sequence of calling for the individual cells constituting a location area without carrying out simultaneous calling, for example, if the calling request is of a kind requiring no real-time immediacy so that delays in calling are not problematic. Therefore, by calling a smaller number of cells as compared with simultaneous calling, the mobile terminal calling apparatus can specify the cell in which the mobile terminal is located, whereby the waste of wireless resources can be reduced. Also, while wireless traffic is ameliorated, the processing in wireless base stations and the control of wireless base stations are carried out efficiently.

Preferably, the mobile terminal calling method further comprises a channel status detecting step in which the mobile terminal calling apparatus detects channel statuses in the plurality of cells constituting the location area, whereas the mobile terminal calling apparatus in the sequencing step decides the sequence of calling in order of excellence of the channel statuses detected by the channel status detecting step.

Thus, the mobile terminal calling apparatus detects the channel statuses in all the cells constituting the location area, and decides the sequence of calling such that the cells are called earlier as their channel statuses are better. Therefore, the mobile terminal calling apparatus can call cells in order of excellence of their channel statuses. In a cell having a better channel status, the field intensity between a wireless base station and a mobile terminal is usually higher, whereby the mobile terminal calling apparatus can easily determine at a high accuracy whether the cell is one in which the mobile terminal exists or not. As a consequence, the mobile terminal calling apparatus can rapidly specify the cell in which the mobile terminal exists.

Preferably, in the mobile terminal calling method in accordance with the present invention, the mobile terminal calling apparatus in the sequencing step decides the sequence of calling in order of closeness to a cell in which the mobile terminal registered a position thereof.

Thus, the mobile terminal calling apparatus decides the sequence of calling such that cells located closer to the cell in which the mobile terminal lastly registered the position thereof are called earlier. The distance to the mobile terminal is shorter in cells located closer to the cell in which the last positional registration was made, so that the probability of the mobile terminal existing there is higher, whereby the mobile terminal calling apparatus can rapidly specify the cell in which the mobile terminal exists.

Preferably, the mobile terminal calling method in accordance with the present invention further comprises a storing step of storing the kind of the calling request and the sequence of calling in relation to each other.

In such a manner, the mobile terminal calling apparatus presets a relationship between the kind of the calling request and the sequence of cells to be called, and refers to data stored in a database unit when deciding the sequence of calling. As a consequence, according to the kind of the calling request determined by the determining step, the mobile terminal calling apparatus can rapidly decide the sequence of calling in conformity to the kind of the calling request.

Preferably, the mobile terminal calling method in accordance with the present invention further comprises a calling step in which the mobile terminal calling apparatus calls the mobile terminal according to the sequence of calling.

As a consequence, by calling a smaller number of cells as compared with simultaneous calling, the mobile terminal calling apparatus can specify the cell in which the mobile terminal is located, whereby the waste of wireless resources can be reduced. Also, while wireless traffic is ameliorated, the processing in wireless base stations and the control of wireless base stations are carried out efficiently.

The exchange apparatus in accordance with the present invention comprises the above-mentioned mobile terminal calling apparatus.

The mobile terminal calling system in accordance with the present invention comprises the above-mentioned exchange apparatus and the above-mentioned plurality of wireless base stations, wherein the exchange apparatus communicates with the plurality of wireless base stations.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

First Embodiment

Figure 1:
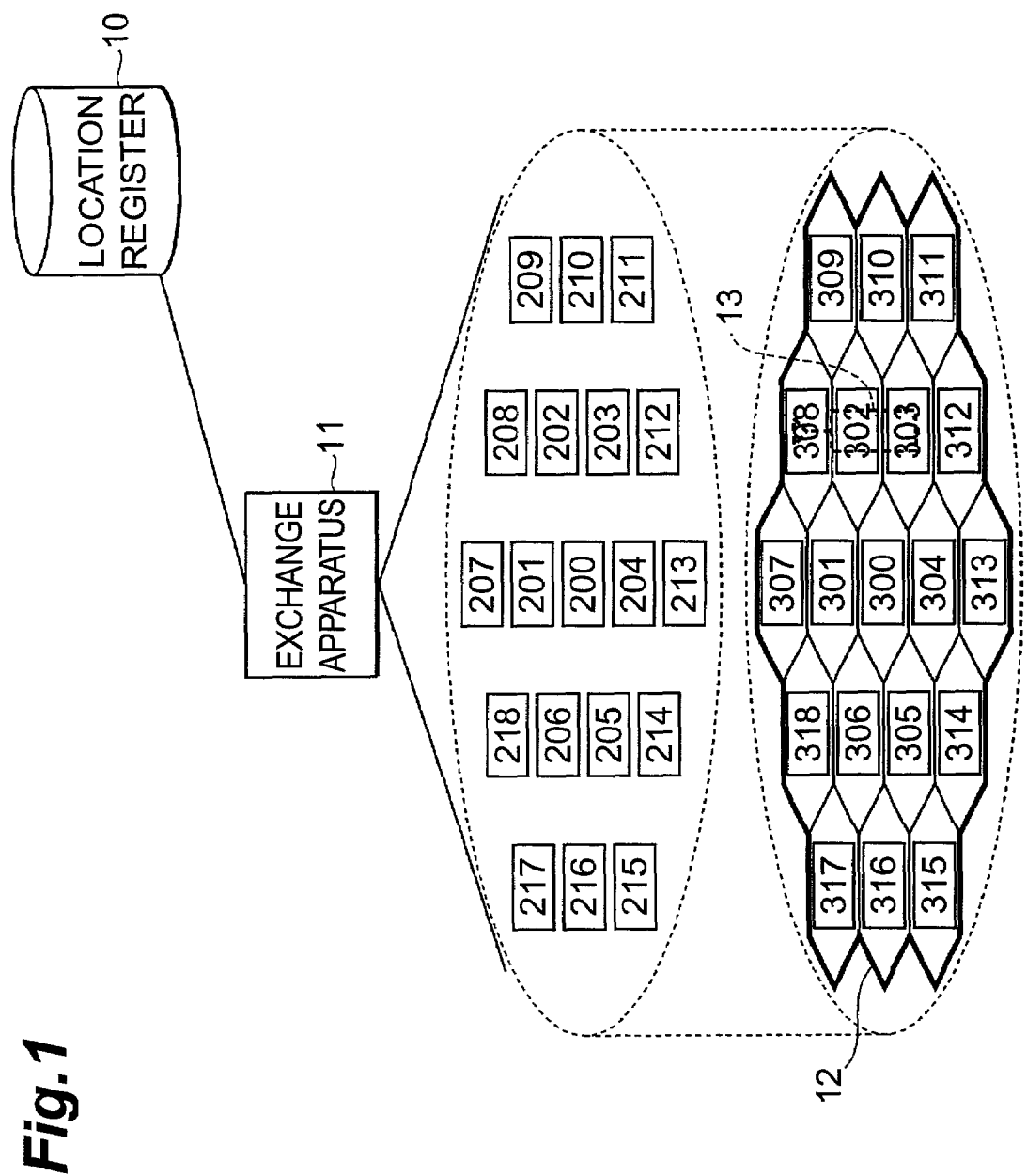
FIG. 1 is a view showing the schematic configuration of the mobile communication system in accordance with a first embodiment.

FIG. 1 is a view showing the schematic configuration of a mobile communication system 1 in accordance with a first embodiment of the present invention. In a location register 10, positional information of a mobile terminal 13, billing information to the user of the mobile terminal 13, and the like are registered. While exchanging transmissions, an exchange apparatus 11 manages communication with a plurality of wireless base stations 200 to 218. The wireless base stations 200 to 218 manage cells 300 to 318, respectively, whereas the cells 300 to 318 constitute a location area 12. In this embodiment, the mobile terminal 13 is assumed to exist in the location area 12.

Figure 2:
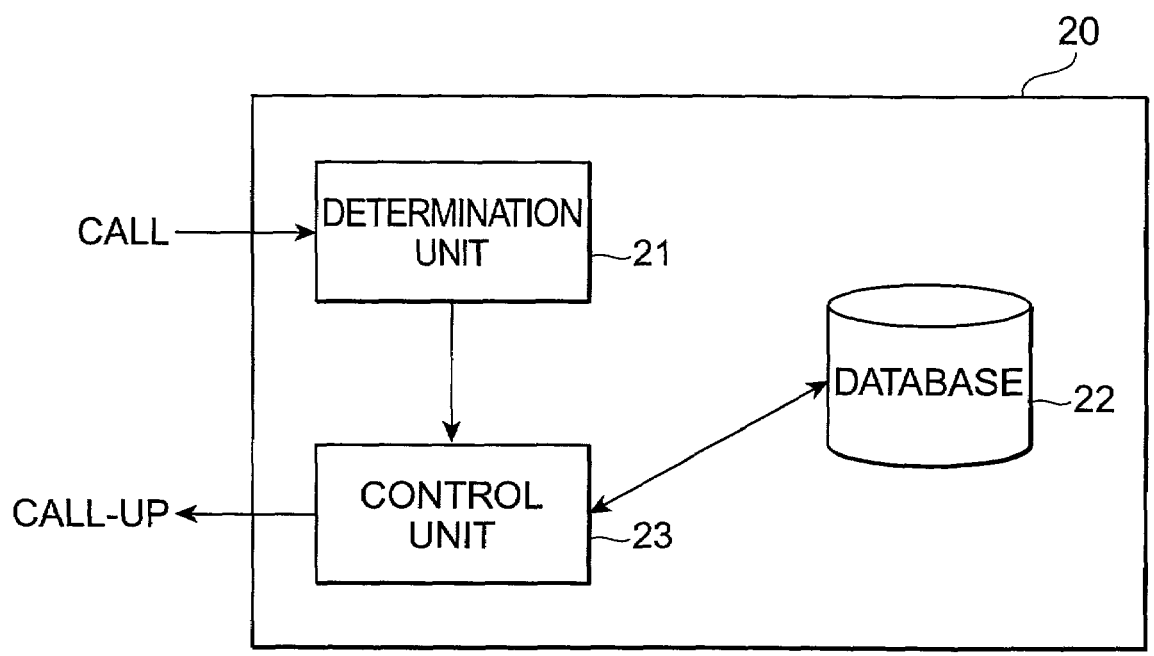
FIG. 2 is a view showing the schematic configuration of a mobile terminal calling apparatus.

The mobile terminal calling apparatus in accordance with the present invention is provided in the exchange apparatus 11. FIG. 2 is a view showing the schematic configuration of the mobile terminal calling apparatus 20. When an incoming call occurs to the mobile terminal 13 existing in the location area 12, the location register 10 in which the positional information of the mobile terminal 13 is registered requests the exchange apparatus 11 to call the mobile terminal 13. In a mobile terminal calling apparatus 20 within the exchange apparatus 11, a determination unit 21 (corresponding to determination means) determines the kind of the calling request. Assumed to exist here are two kinds of calling requests, i.e., real-time calls of a kind requiring real-time immediacy, such as voice calls, in which delays become problematic, and non-real-time calls of a kind not requiring real-time immediacy, such as email, in which delays are not problematic.

For example, according to VCI (Virtual Channel Identifier) and VPI (Virtual Path Identifier) within an ATM cell header, the determination unit 21 determines the kind of the calling request from header information of a data packet sent. The determination unit 21 may also determine the kind of the calling request from protocol information of the data packet sent. The result of determination effected by the determination unit 21 is outputted to a control unit 23.

Figure 3:
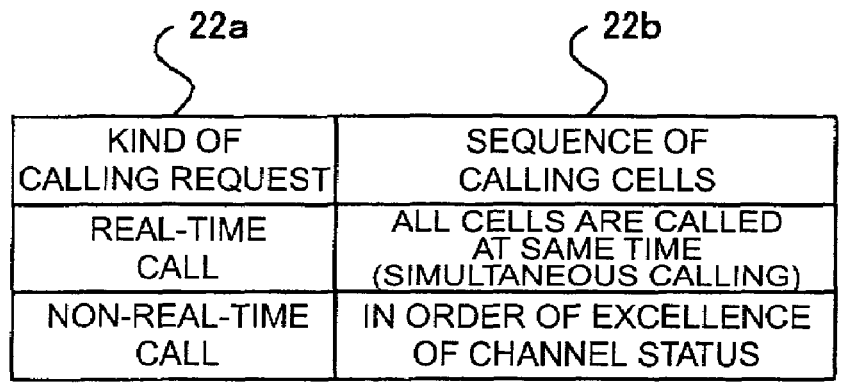
FIG. 3 is a chart showing an example of data storage within a database.

A database 22 (corresponding to a database unit) stores the kinds of calling requests and sequences of cells to be called in relation to each other. FIG. 3 is a chart showing an example of data storage within the database 22. In the case where the kind of the calling request is a real-time call, as shown in FIG. 3, the sequence of calling cells corresponds to one in which all the cells 300 to 318 constituting the location area 12 are called at the same time, i.e., simultaneous calling. In the case where the kind of the calling request is a non-real-time call, by contrast, the cells 300 to 318 are called in order of excellence of their channel statuses.

Figure 4:
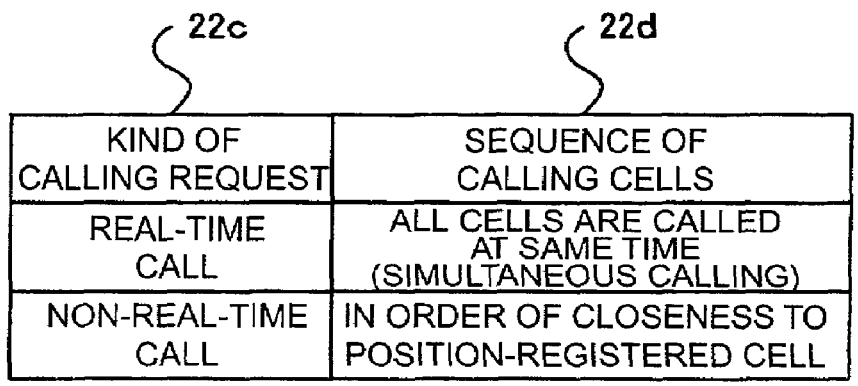
FIG. 4 is a chart showing a modified mode of the example of data storage within the database.

FIG. 4 is a chart showing an example of data storage within the database 22 in a modified mode of this embodiment. In the case where the kind of the calling request is a real-time call, as shown in FIG. 4, the sequence of calling cells corresponds to one in which all the cells 300 to 318 constituting the location area 12 are called at the same time, i.e., simultaneous calling. In the case where the kind of the calling request is a non-real-time call, by contrast, the cells 300 to 318 are called in order of closeness to a cell in which the mobile terminal 13 lastly registered its positional information into the location register 10. The sequence of calling cells may be random as well.

In such a manner, a relationship between the kinds of calling requests and sequences of calling is set beforehand. Therefore, as the control unit 23 refers to data stored in the database 22, a sequence of calling corresponding to the kind of the calling request determined by the determination unit 21 can be decided easily and rapidly according to the kind of the calling request.

The control unit 23 (corresponding to sequencing means, channel status detecting means, and calling means) has both of a function of deciding the sequence of calling the individual cells and a function of calling the mobile terminal according to thus decided sequence of calling. Namely, according to the result of determination fed from the determination unit 21 and the sequence of calling, acquired from the database 22, corresponding to the kind of the calling request, the control unit 23 decides the sequence of calling cells.

The control unit 23 also has a function of detecting channel statuses, thereby being able to decide the sequence such that cells are called in order of excellence of thus detected channel statuses. Whether channel statuses are favorable or not is determined according to report information sent from each of the wireless base stations 200 to 218 to the exchange apparatus 11. For example, this report information is data indicating the field intensity between each wireless base station 200 to 218 and another mobile terminal (not depicted) located in each cell 300 to 318.

Thus, the control unit 23 detects respective channel statuses in all the cells constituting the location area 12, and decides the sequence of calling such that cells having better channel statuses are called earlier, whereby cells can be called in order of excellence of their channel statuses. In a cell having a better channel status, the field intensity between a wireless base station and a mobile terminal is higher, whereby the control unit 23 can easily determine at a high accuracy whether the cell is one in which the mobile terminal 13 exists or not. As a consequence, the control unit 23 can rapidly specify the cell in which the mobile terminal 13 exists.

Also, when the control unit 23 grasps a cell in which the mobile terminal 13 lastly registered its position into the location register 10, a sequence can be decided such that this cell or its neighboring cell is called earlier. The distance to the mobile terminal 13 is shorter in cells located closer to the cell in which the last positional registration was made, whereby the probability of the mobile terminal 13 existing there is higher. Therefore, by calling cells in order of closeness to the cell in which the last positional registration was made, the control unit 23 can rapidly specify the cell in which the mobile terminal 13 exists. Such a manner of deciding the sequence of calling cells is effective in particular in the case where time has not elapsed much after the positional registration of the mobile terminal 13 or where the speed of the mobile terminal 13 is low.

On the other hand, according to the decided sequence of calling, the control unit 23 calls each cell or each area constituted by a plurality of cells. In this case, the control unit 23 may carry out calling for each cell or for each area comprising a plurality of cells which have been grouped beforehand.

Figure 5:
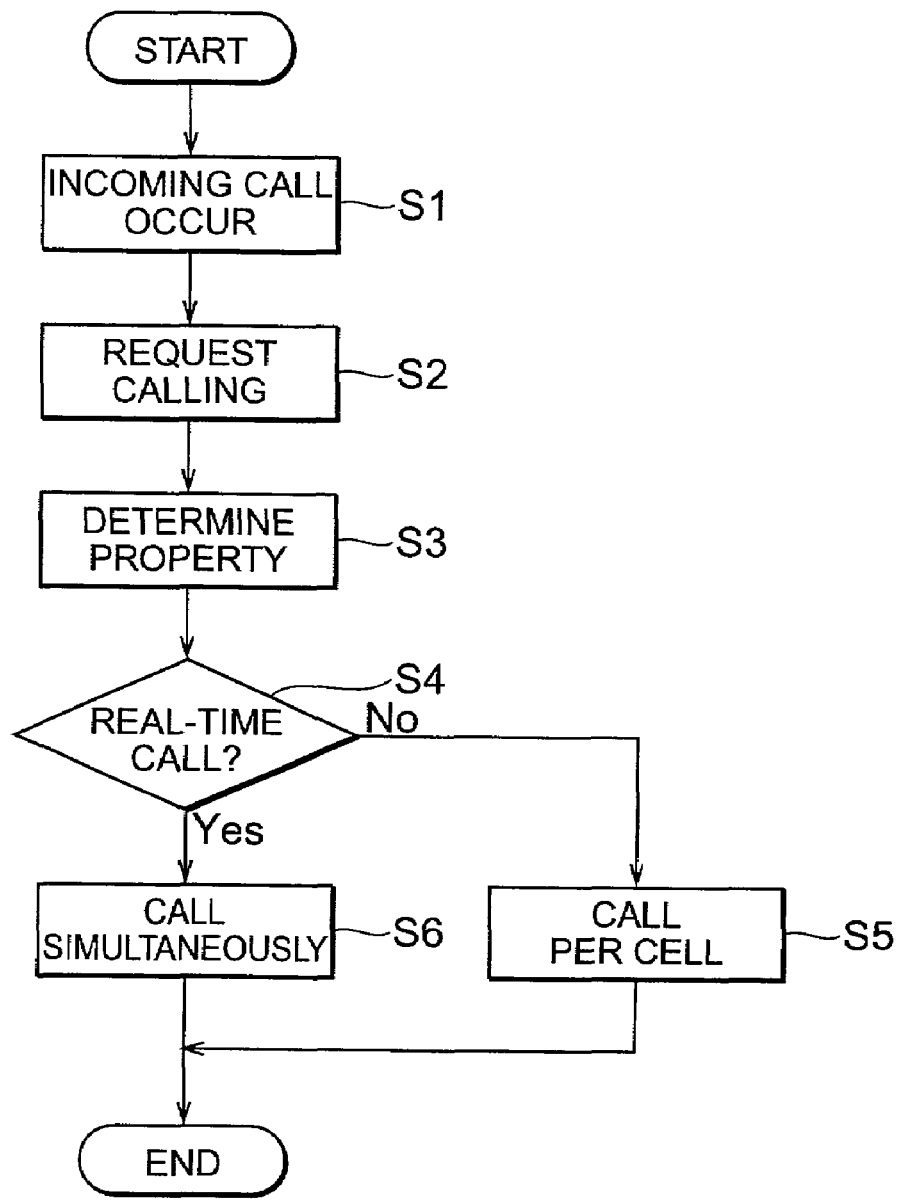
FIG. 5 is a flowchart showing operations of the mobile communication system in accordance with the first embodiment.

Operations of the mobile communication system 1 in accordance with the first embodiment of the present invention will now be explained. FIG. 5 is a flowchart showing operations of the mobile communication system 1 in accordance with the first embodiment. First, an incoming call occurs to the mobile terminal 13 existing in the location area 12 (step S1). The location register 10 requires the exchange apparatus 11 to call the mobile terminal 13 (step S2).

From header information or protocol information from thus sent data packet, the mobile terminal calling apparatus 20 within the exchange apparatus 11 determines the kind of the calling request (step S3). If the result of determination indicates that the kind of the calling request is not a real-time call, i.e., it is a non-real-time call, then the mobile terminal calling apparatus 20 carries out calling for each cell or for each area constituted by a plurality of cells according to the sequence of calling decided with reference to the database 22 as shown in FIG. 6 (step S5).

Figure 6:
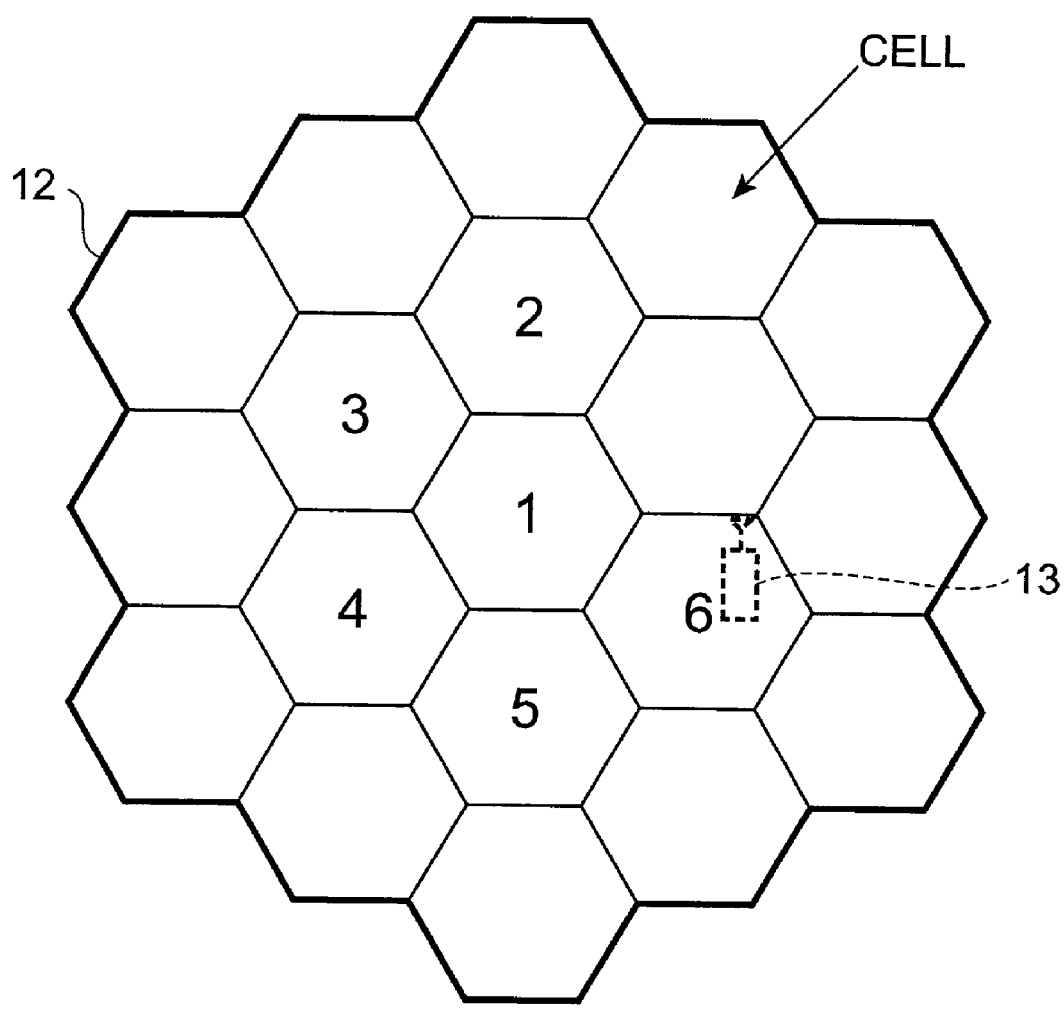
FIG. 6 is a view showing an example of sequence of calling cells constituting a location area.

In the case where the mobile terminal 13 is located at the position shown in FIG. 6 whereas cells 1, 2, 3, 4, 5, 6 are called in this order from the one positioned at the center of the location area 12, the mobile terminal calling apparatus 20 can recognize the cell in which the mobile terminal 13 exists at the time when calling the sixth cell 6. Consequently, as compared with the case where all the cells (19 cells) constituting the location area 12 are called, the waste of wireless resources can be reduced, and the calling processing can be made more efficient.

The cell in which the mobile terminal 13 exists is completely specified when a calling response from the mobile terminal 13 is received by the exchange apparatus 11. However, due to deterioration in a wireless environment about the mobile terminal 13 and the like, the exchange apparatus 11 may fail to receive the calling response from the mobile terminal 13. Therefore, if the exchange apparatus 11 fails to receive the calling response from the mobile station 13 in spite of the fact that the mobile terminal calling apparatus 20 carried out calling for all the cells constituting the location area 12, calling will be carried out again in the same procedure within the location area 12.

Figure 7:
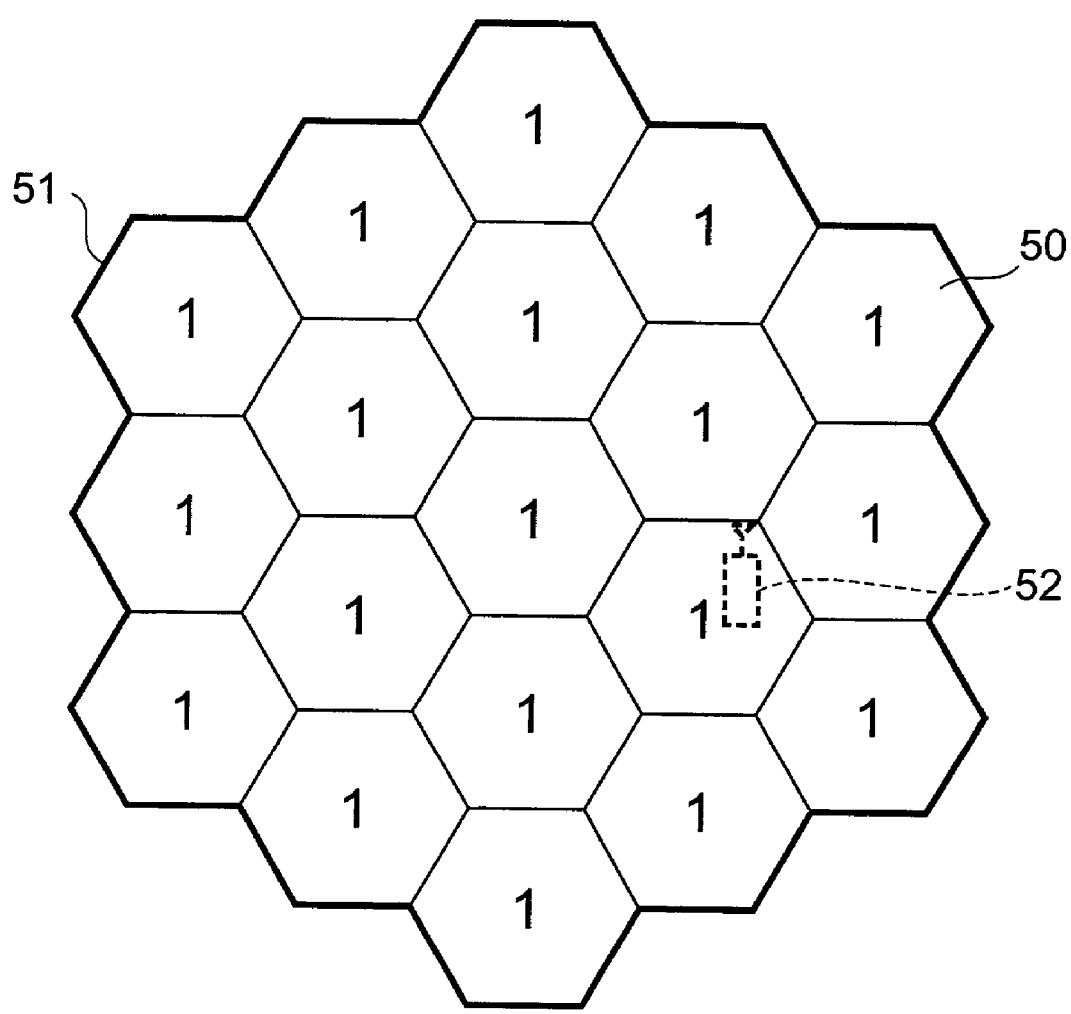
FIG. 7 is a view showing the mobile communication system calls all the cells constituting a location area simultaneously.

In the case where the kind of the calling request is a real-time call at step S4, all the cells are called at the same time, i.e., simultaneous calling is carried out, as shown in FIG. 7 (step S6).

In the mobile communication system 1 in accordance with this embodiment, as explained in the foregoing, the determination unit 21 determines the kind of the calling request. Therefore, when the calling request is of a kind not requiring real-time immediacy, in which delays are not problematic, the control unit 23 can decide the sequence of calling for the individual cells or for the individual areas each constituted by a plurality of cells instead of carrying out simultaneous calling. As a consequence, by calling a smaller number of cells as compared with simultaneous calling, the control unit 23 can specify the cell in which the mobile terminal 13 exists. As a result, the waste of wireless resources can be reduced. Also, while wireless traffic is ameliorated, the processing in wireless base stations and the control of wireless base stations are carried out efficiently.

Second Embodiment

Figure 8:
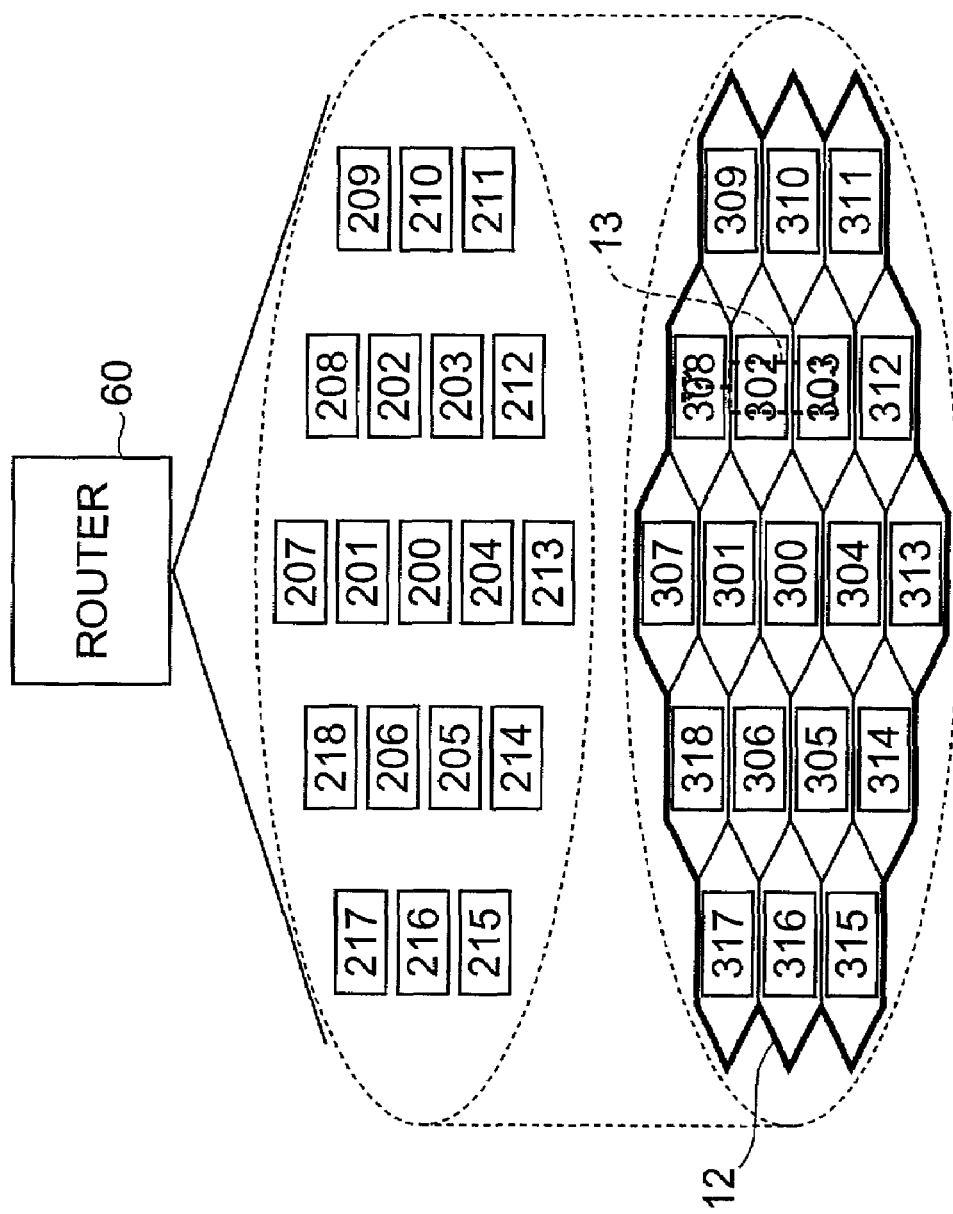
FIG. 8 is a view showing the schematic configuration of the mobile communication system in accordance with a second embodiment.

FIG. 8 is a view showing the schematic configuration of a mobile communication system 2 in accordance with a second embodiment. In this embodiment, an IP node (e.g., router 60) decides the sequence of cells to be called. As shown in FIG. 8, the mobile communication system 2 is constituted by the router 60, wireless base stations 200 to 218, and a mobile terminal 13. The router 60 comprises a mobile terminal calling apparatus 20 as in the first embodiment. Also, cells 300 to 318 managed by the wireless base stations 200 to 218, respectively, constitute a location area 12.

Here, it is assumed that an incoming call occurs to the mobile terminal 13. The fact that the mobile terminal 13 exists in the cells 300 to 318 under the control of the router 60 can be grasped by use of Home Agent in Mobile IP, for example, where by data packets directed to the mobile terminal 13 can reach the router 60.

A determination unit 21 inside the router 60 determines header information or protocol information of a data packet sent, and outputs the result thereof to the control unit 23. The control unit 23 refers to a database 22 according to thus inputted information, and decides a method of calling the mobile terminal 13. If the incoming call to the mobile terminal 13 is a non-real-time call here, the control unit 23 calls the cells constituting the location area 12 one by one as shown in FIG. 6.

Here, the sequence of calling cells maybe set in any order, such as in order of excellence of channel status, in order of closeness to the cell in which the mobile terminal 13 lastly registered its position, and in a random sequence. By calling 6 cells alone, as shown in FIG. 6, the mobile communication system 2 in accordance with the second embodiment can specify the cell in which the mobile terminal 13 exists. Therefore, it is possible to realize a calling method which is more efficient than the conventional case where 19 cells are called.

The cell in which the mobile terminal 13 exists is completely specified when a calling response from the mobile terminal 13 is received by the router 60. However, due to deterioration in a wireless environment about the mobile terminal 13 and the like, the router 60 may fail to receive the calling response from the mobile terminal 13. Therefore, if no calling response returns from the mobile station 13 in spite of the fact that all the cells constituting the location area 12 are called, the control unit 23 will carry out calling again in the same procedure within the location area 12.

Modified examples of the present invention will now be explained. Though each of the above-mentioned embodiments is explained while assuming that there are two kinds of calling requests, i.e., real-time calls and non-real-time calls, the present invention is not restricted thereto but is applicable to cases where kinds of calls are categorized in a greater number of classes.

Though the first embodiment shows an example in which the mobile terminal calling apparatus 20 is mounted in the exchange apparatus 11, modes in which the mobile terminal calling apparatus 20 is mounted in a position managing apparatus (e.g., location register 10) or wireless base station apparatus (e.g., wireless base stations 200 to 218) may also be employed.

Though each of the above-mentioned embodiments shows a case where the location area 12 is set statically, the present invention is also applicable to a case where the location area 12 is set dynamically. In the latter case, contents of a database managing cell information (e.g., cell ID information) within the location area 12 are changed dynamically.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile terminal calling apparatus for calling a mobile terminal existing in a location area constituted by a plurality of cells corresponding to a plurality of wireless base stations, said mobile terminal calling apparatus comprising:

determination means for determining, when there is a calling request for said mobile terminal, a kind of said calling request;

sequencing means for deciding, according to said kind of said calling request determined by said determination means, a sequence of calling for said plurality of cells constituting said location area; and channel status detecting means for detecting channel statuses in said plurality of cells constituting said location area;

wherein said sequencing means decides said sequence of calling in order of excellence of said channel statuses detected by said channel status detecting means.

2. A mobile terminal calling apparatus according to claim 1, further comprising a database unit for storing said kind of said calling request and said sequence of calling in relation to each other.

3. A mobile terminal calling apparatus according to claim 1, further comprising calling means for calling said mobile terminal according to said sequence of calling.

4. An exchange apparatus comprising the mobile terminal calling apparatus according to claim 1.

5. A mobile communication system comprising the exchange apparatus according to claim 4, and said plurality of wireless base stations, wherein said exchange apparatus communicates with said plurality of wireless base stations.

6. A mobile terminal calling method in which a mobile terminal calling apparatus calls a mobile terminal existing in a location area constituted by a plurality of cells corresponding to a plurality of wireless base stations, said method comprising:

a determining step of determining, when there is a calling request for said mobile terminal, a kind of said calling request;

a sequencing step of deciding, according to said kind of said calling request determined by said determining step, a sequence of calling for said plurality of cells constituting said location area; and a channel status detecting step of detecting channel statuses in said plurality of cells constituting said location area;

wherein said sequence of calling is decided in said sequencing step in order of excellence of said channel statuses detected by said channel status detecting step.

7. A mobile terminal calling method according to claim 6, further comprising a storing step of storing said kind of said calling request and said order of calling in relation to each other.

8. A mobile terminal calling method according to claim 7, further comprising a calling step of calling said mobile terminal according to said sequence of calling.

* * * * *